United States Patent [19]  [11] 4,229,301
Roberts  [45] Oct. 21, 1980

[54] MECHANICALLY RAKED BAR SCREEN
[75] Inventor: Raymond Roberts, Watford, England
[73] Assignee: Hawker Siddeley Bracket Limited, Hythe, England
[21] Appl. No.: 917,023
[22] Filed: Jun. 16, 1978
[30] Foreign Application Priority Data
Jun. 23, 1977 [GB] United Kingdom ............... 26309/77
[51] Int. Cl.² ............................................. E02B 5/08
[52] U.S. Cl. ................................................... 210/159
[58] Field of Search ............... 210/153, 154, 155, 158, 210/159, 161, 162, 413

[56] References Cited
U.S. PATENT DOCUMENTS

| 1,794,504 | 3/1931 | Norman ............................. 210/159 |
| 2,009,005 | 7/1935 | Schofield et al. .................... 210/159 |
| 2,086,821 | 7/1937 | Raisch ................................ 210/159 |
| 3,464,558 | 9/1969 | Harranek et al. .................... 210/159 |

FOREIGN PATENT DOCUMENTS

| 148021 | 12/1901 | Fed. Rep. of Germany ........... 210/159 |
| 87062 | 5/1907 | Fed. Rep. of Germany ........... 210/159 |
| 2502725 | 7/1976 | Fed. Rep. of Germany ........... 210/159 |
| 372865 | 4/1907 | France ..................................... 210/159 |
| 33741 | 8/1911 | Sweden ................................... 210/154 |
| 711944 | 10/1952 | United Kingdom ..................... 210/159 |
| 832728 | 4/1960 | United Kingdom ..................... 210/159 |
| 857310 | 12/1960 | United Kingdom ..................... 210/159 |

Primary Examiner—Theodore A. Granger
Attorney, Agent, or Firm—Mason, Fenwick & Lawrence

[57] ABSTRACT

A mechanically raked bar screen, particularly for use in screening sewage, which comprises an array of screen bars in side-by-side, spaced-apart relationship, each bar being removably mounted on bar mountings and preferably so mounted that each bar can move towards or away from adjacent bars.

8 Claims, 10 Drawing Figures

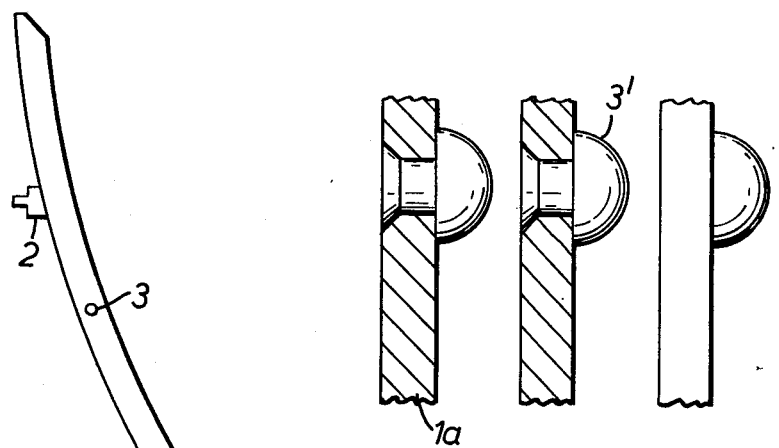
FIG. 3.
FIG. 4.

MECHANICALLY RAKED BAR SCREEN

The invention relates to a mechanically raked bar screen.

Mechanically raked bar screens are used in a variety of circumstances, for example, in the treatment of sewage to remove suspended solids from a flow of water or effluent. Such a screen comprises an array of screen bars arranged in side-by-side, spaced apart relationship, the array extending across the flow path of contaminated liquid to be screened, and a rake which is operable to comb between the bars, on their upstream side, to remove solids which have been screened out of the flow of contaminated liquid and lodged in the spaces between the screen bars. The configuration of the screen bar array may vary; for example, the bars may be straight, and aligned either vertically or obliquely to the vertical, or they may be curved, in which case they will generally be arranged with their concave sides facing upstream of the flow of liquid to be screened.

Hitherto in the construction of mechanically raked bar screens, the screen bar arrays have generally been made as single units by welding the component bars together in their end regions, or by welding the bars to a common mounting or mountings. A problem with making the bar arrays in this way is that welding can give rise to excessive distortion and it is consequently difficult to achieve the desired accuracy of spacing between the bars. The present invention was devised with a view to overcoming or greatly reducing this problem.

According to the present invention there is provided a bar screen which comprises bar mountings on which are mounted on array of screen bars in side-by-side, spaced-apart relationship, and rake means arranged to rake from the upstream side of the screen bars solids retained thereby, each screen bar being removably mounted on bar mountings and the screen being provided with a plurality of spacer means to ensure a minimum spacing between each pair of adjacent bars.

Hence the arrangement of the invention avoids the problems associated with welding. Further, if an individual bar does become distorted, then it is a relatively easy matter to straighten it, in contrast with the difficulty encountered in trying to produce substantially distortion-free bar arrays when using the earlier technique of welding the bars together.

It is preferred that at least some of the bars of the array, though preferably all the bars of the array, are movable. It may, in some circumstances be desirable to fix the end bars of the array. The optimum ratio of the thickness of the spacer means to the mean of the spacing between each pair of adjacent bars measured in the region of the respective spacing means depends on the circumstances in which the screen is being used and the composition, size and shape of the solids being screened out. Generally, the ratio is in the range of from 1:10 to 9:10.

The spacer means are advantageously of a streamlined configuration so that solids will tend not to lodge on them, causing blockages. They may, for example, comprises protuberances of a substantially hemispherical, conical, frustoconical, cylindrical, or semi-sylindrical configuration, each screen bar being provided with one or more of these protuberances.

Each bar that is movable is preferably mounted on two mountings, and is held firmly by one of the mountings and so mounted on the second mounting that it is free move. Since the material out of which the screen bars are made will, in general, possess at least some degree of resilience, some lateral movement of the bars is possible. The precision in matching the spacings between adjacent times of the rake means and the bar spacings is therefore less critical. If, as is preferred, each bar of the array of bars is so mounted that one end is higher than the other, the lower portion of each bar that is movable may be mounted on the first type of mounting, that is to say, the mounting in which the bar is held firmly, and the upper portion of the bar may be mounted on the second type of mounting, that is to say, the mounting in which the bar is free to move laterally.

A convenient arrangement is one in which the lower end of bar is inserted in a slot in the top of a covered channel, the channel advantageously being made of steel. The slots are somewhat wider than the bars, thus permitting the bars to be easily and simply inserted and removed. The bars are prevented from moving in these lower mountings, when the screen is in operation, by a keeper plate which is removably secured to the channel cover, and jammed up against the lower end portion of each bar. The channel will generally be permanently fixed across the floor of the duct in which the liquid to be screened flows. Each upper bar mounting may advantageously comprise a hole preferably circular in shape, formed in a fixed vertical face, each bar being provided in its upper region with a flange, of a lesser dimension than the diameter of the holes, which fits in one of the holes. Owing to the relative dimensions of the flanges and the circular holes, the bars have a limited degree of sideways movement when the flanges are projecting into their respective holes. The flanges may conveniently be welded to the bars.

The screen bars cannot, or course, move a greater distance sideways on their mountings than the distance permitted by the action of the spacer means, which hence determine the minimum spacing of the bars.

A mechanically raked bar screen, constructed in accordance with the invention, will now be described, by way of example, with reference to the accompanying drawings, in which:

FIG. 3 is a side view of one of the individual bars making up the screen bar array;

FIG. 4 is a more detailed view of the spacer arrangement on the screen bars;

Figure 1:
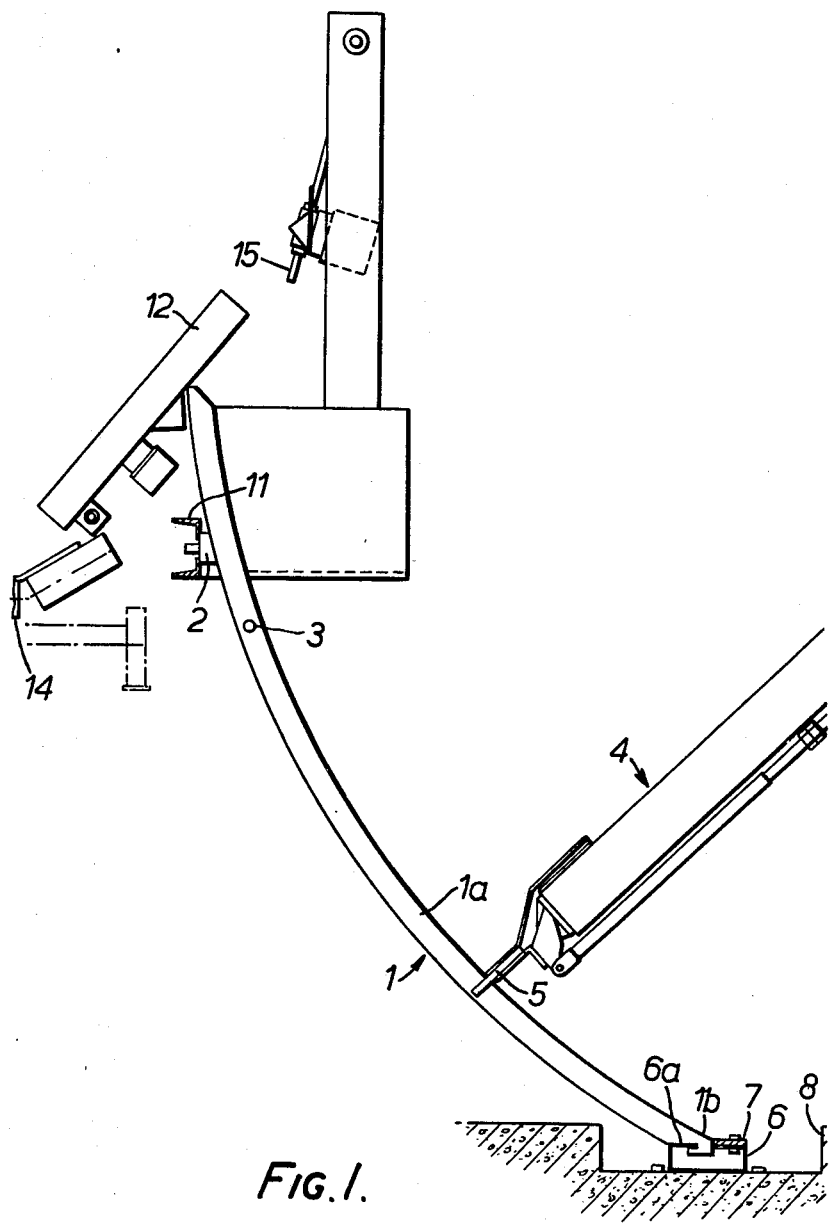
FIG. 1 is a sectional side view of a screen bar assembly, showing the comb-end portion of a rake for cleaning between the bars.
Figure 2:
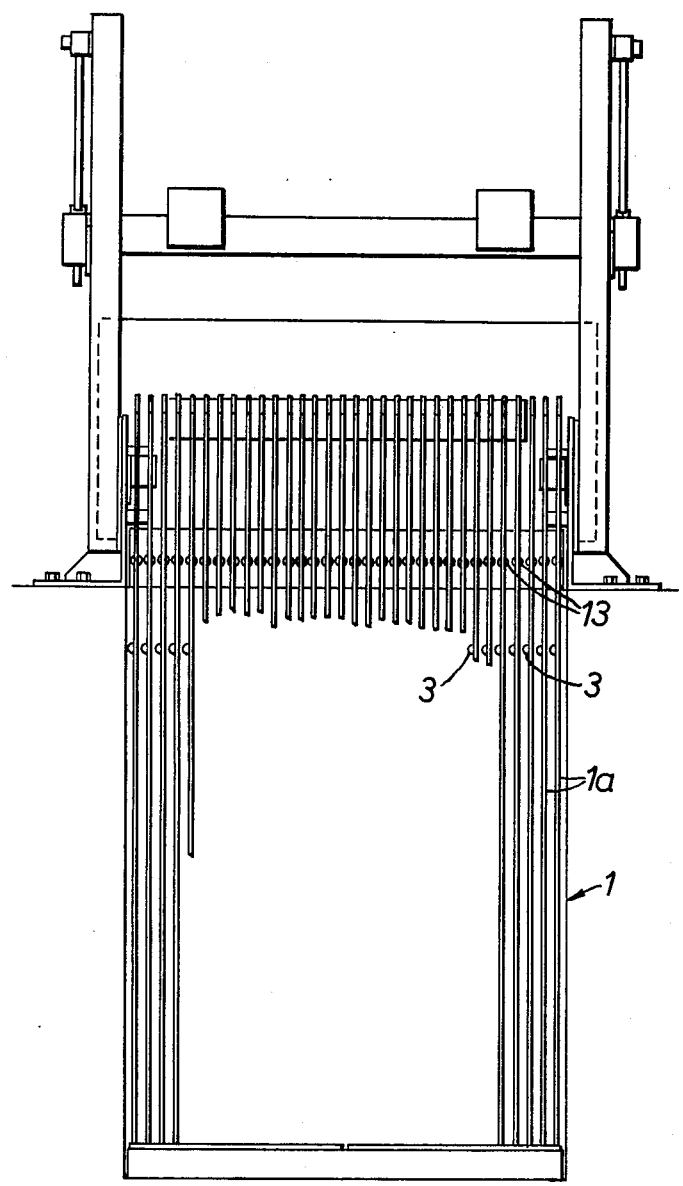
FIG. 2 is a partial front view of the screen bar array of the assembly shown in FIG. 1, looking downstream along the flow of liquid to be screened, away from the rake.

With reference to the drawings, and initially to FIGS. 1 and 2, an array of screen bars, indicated generally by the reference numeral 1, comprises an array of curved screen bars 1a, made from mild steel, arranged in side-by-side, spaced apart relationship. The screen bar array 1 extends across a flow channel for liquid to be screened, with the concave faces of the bars 1a facing upstream. The screen bars 1a are each removably secured at their lower ends 1b, and in their upper regions by means of a flange 2 secured to each bar, in a manner described in detail below. the bars 1a are so mounted that they can move sideways in their upper mountings, towards and away from adjacent bars, to a limited extent. A spacer 3, comprising a substantially hemispherical protuberance, is provided on each bar to further regulate the spacing between the bars.

As will be seen in FIGS. 2 and 4, each spacer 3 extends over only a part of the mean distance between adjacent bars 1a. In the particular arrangement shown in FIG. 4, the spacers 3 extend across two-thirds of the mean bar spacing. All the spacers 3 are aligned, thereby ensuring a minimum spacing between adjacent bars 1a equal to the horizontal extension of a spacer.

A screen rake, indicated generally by the reference numeral 4 and shown in FIG. 1, is provided upstream of the bar array 1 for combing lodged debris out of the spaces between the screen bars 1a by means of a terminal comb portion comprising tines 5. The screen rake 4 is of a known construction and is operated in a known manner, to comb upwards between the bars 1a, by means of a rake drive (not shown). The rake drive is such as to drive the rake 4 so that its terminal comb portion, comprising the tines 5, describes a shallow elliptical path so that in rising the comb portion travels with its tines meshed with the bar array 1, thereby clearing screened-out solids. The rake 4 may operate either continuously or intermittently, depending on flow conditions. It may be automatically actuated, for example, by a time switch or by a signal form control equipment which measures the extent of blockage of the spaces between the bars 1a. After clearing the top of the bar screen a deflector plate 12 retains the dislodged screenings on the rake 4 until they are removed into a conveyor 14, or, alternatively, a trough, by a hinged cleaning arm 15.

Figure 5:
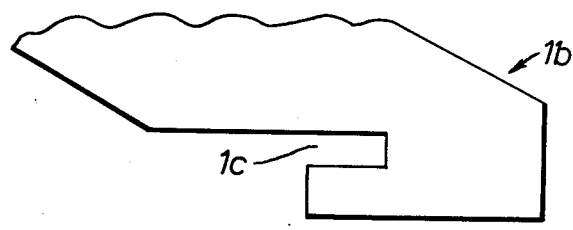
FIG. 5 is a detailed view of the lower end portion of an individual screen bar.
Figure 6:
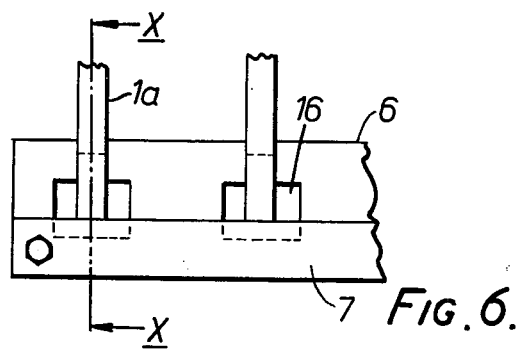
FIG. 6 is a plan view of the lower end portions of two bars, in the mountings.
Figure 7:
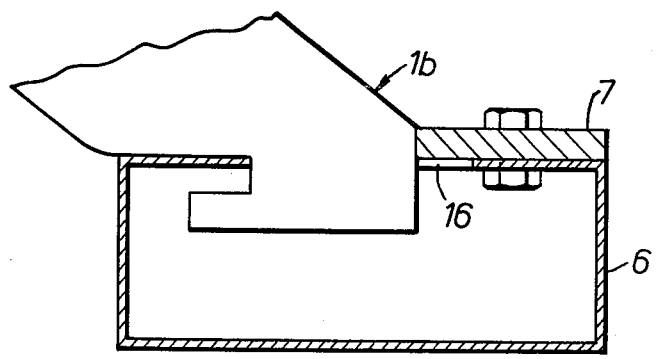
FIG. 7 is a section taken along the line X—X in FIG. 6.

Referring now to FIGS. 3, 5 and 7, it will be seen that the lower end portion 1b of each bar is so shaped as to have a horizontally extending indent 1c, the end portion 1b of the bar thereby having a hook like configuration. Each lower end portion 1b is mounted in a slot 16 in a hollow steel member which is in the form of a covered channel 6, as shown in FIGS. 1, 6 and 7, the slots 16 for the lower bar regions 1b being formed in the top or cover 6a, and being substantially equidistant from each other. The lower end portions 1b are retained in position in the channel 6 by means of a keep plate 7, which is removably secured to the channel cover 6a. The hollow steel member 6 is bolted and grouted to the concrete floor 8 of the channel in which the liquid to be screened flows. The width of each slot 16 in the channel cover 6a is greater than the width of a bar 1a so as to permit easy insertion and removal of the bars. The keep plate 7 is held tightly against the lower end portions 1b of the bars so as to prevent movement of the bars within the slots 16.

Figure 8:
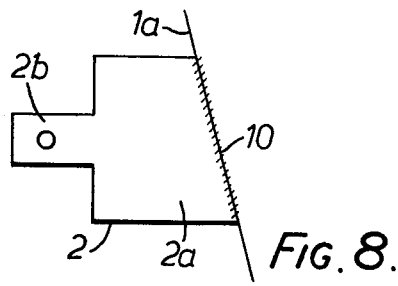
FIG. 8 is a detailed view of a flange on the upper region of a screen bar.

As shown in FIG. 3, and in more detail in FIG. 8, each bar 1a is provided, in its upper region, with a flange 2, joined by a welded joint 10 to the bar. Each flange 2 comprises a flange base 2a, which is welded at the joint 10 to the bar 1a, and a narrow flange tongue 2b.

Figure 9:
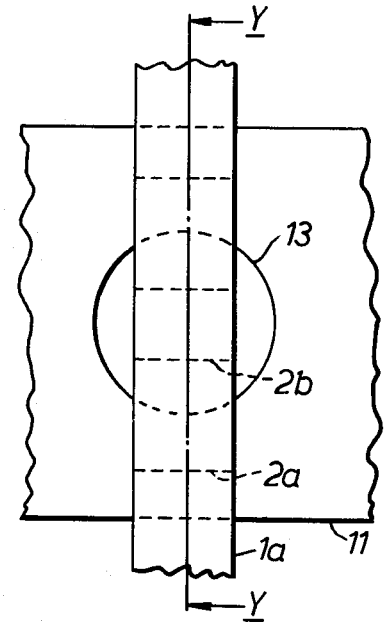
FIG. 9 is a detailed front view of the upper mounting of a screen bar.
Figure 10:
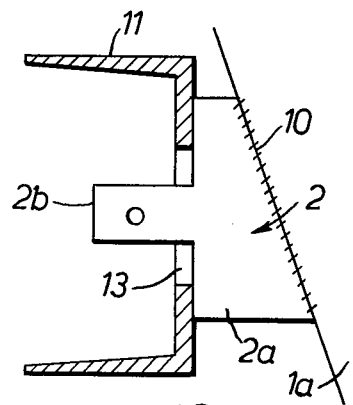
FIG. 10 is a section taken along the line Y—Y in FIG. 9.

A horizontally extending, channel-shaped member 11, which is fixed with respect to the flows channel through which liquid to be screened is passed, is provided at regular intervals along its length with circular apertures 13, into each of which a flange tongue 2b projects. As can be clearly seen from FIGS. 9 and 10, the diameter of the holes 13 is greater than the lateral or vertical dimensions of the flange tongues 2b, and the bars 1a are therefore free to move laterally to an extent limited by the relative dimensions of the circular holes and the flange tongues. Since the bars 1a are substantially fixed with respect to their lower mountings, additional restraints on the lateral movement of the bars are imposed by the resilience of the material from which the bars are made, and of course, by the dimensions of the spacers 3.

It will be apparent that various modifications can be made to the construction described above while still remaining within the scope of the invention. For example, the screen bars 1a may be made from material other than mild steel, for example, stainless steel. The spacer arrangement may also be different; an alternative arrangement to that described above is to provide each bar with two spacers, arranged in opposed relationship on either side of the bar and with all the spacers aligned. In this case, the sideways extent of each spacer would have to be less than half the mean distance between the screen bars so as to allow the tines of the screen rake to comb between the bars over the their entire length.

What we claim is:

1. A mechanically raked bar screen for removing solids from liquid flowing therethrough comprising bar mountings on which are removably mountd an array of screen bars in side-by-side spaced-apart relationship, movable rake means having tines extending between adjacent screen bars for raking from the upstream side of the screen bars the solids retained thereby and spacer means fixed to at least one bar of each pair of adjacent bars and arranged to ensure that the spacing between the bars of each pair of adjacent bars is not less than a minimum value, each bar being mounted on a first and a second mounting, at least one bar of each pair of adjacent bars being held against lateral movement at the first mounting, and being mounted on the second mounting for permitting lateral movement toward or away from the other bar of the pair in response to the application of force from one or more tines during raking of the bar screen.

2. A screen as claimed in claim 1, wherein the arrangement is such that each bar, except, if desired, the bars at each end of the array, can move, in operation, laterally towards or away from adjacent bars.

3. A screen as claimed in claim 1, wherein the ratio of the thickness of each fixed spacer means to the mean of the spacing between each pair of adjacent bars measured in the region of the respective fixed spacer means is in the range of from 1:10 to 9:10.

4. A screen as claimed in claim 1, wherein each bar is so mounted that one end is higher than the other, and the lower portion of the bar that is movable is mounted on a first mounting, and the upper end is mounted on a second mounting.

5. A screen as claimed in claim 4, wherein each first mounting comprises a slot in the top of a covered channel in which the lower end portion of each bar that is movable is located and a keep plate removably secured with respect to the channel which is jammed up against the lower portion of each bar that is movable to retain it within the channel.

6. A screen as claimed in claim 4, wherein each second mounting comprises a fixed vertical face having a hole formed therein and each bar that is movable is provided with a flange at its upper end portion which flange is smaller than a hole, the arrangement being such that the flange of each bar that is movable projects into a hole.

7. A screen as claimed in claim 1, wherein each spacer means is a protuberance formed on one or on each of a pair of adjacent bars, the arrangement being such that a protuberance formed on one bar of a pair of adjacent bars can contact the other bar of the pair.

8. A screen as claimed in claim 7, wherein each protuberance is of a streamlined configuration.

* * * * *